United States Patent [19]

Livingston

[11] 4,364,335

[45] Dec. 21, 1982

[54] ANIMAL FEEDER

[76] Inventor: Allan Livingston, Kenmare, N. Dak.

[21] Appl. No.: 256,076

[22] Filed: Apr. 21, 1981

[51] Int. Cl.³ .............................................. A01K 5/00
[52] U.S. Cl. ................................................... 119/61
[58] Field of Search ........................................ 119/61

[56] References Cited

U.S. PATENT DOCUMENTS 2,592,638  4/1952  Andrew ................................ 119/61
3,074,377  1/1963  Spencer ............................... 119/61

FOREIGN PATENT DOCUMENTS 2277527  2/1976  France ................................. 119/61
169270  2/1934  Switzerland ......................... 119/61

*Primary Examiner*—Jay N. Eskovitz
*Attorney, Agent, or Firm*—Hugh D. Jaeger

[57] ABSTRACT

Feeder for grain or like type of feed comprising a cone supported substantially in the center of a circular member having upwardly extending lips. The cone can be of galvanized sheet metal or like material and the circular member can be a tire. The specific size of the circular member determines the size of the cone. A tractor tire in combination with a cone is well suited for a grain feeder for livestock.

5 Claims, 4 Drawing Figures

ANIMAL FEEDER

BACKGROUND OF THE INVENTION

1. Field of the Invention

The present invention relates to agricultural equipment and, more particularly, pertains to a feeder such as a grain feeder for livestock on the farm or ranch.

2. Description of the Prior Art

Prior art grain feeders have usually been constructed from galvanized sheet metal and are not only bulky and cumbersome to handle as an agricultural implement for the feeding of livestock, but also entails a certain expense in the operation of a farm. While the prior art feeders are practical, the expense of procuring the feeders for livestock in large farming operations becomes burdensome and decreases the farmer's profits.

It is further particularly burdensome to ship, let alone manufacture, livestock feeders due to the round configuration of the feeders which does not provide for optimum shipping let alone storage of the feeders whether at the implement dealer or on the farm.

The present invention overcomes the disadvantages of the prior art by providing a feeder which utilizes old tractor tires or generically any old tires which are always prevalent in the agricultural industry, especially on the farm, and a sheet metal cone which can be easily manufactured and transported for least cost.

SUMMARY OF THE INVENTION

The general purpose of the present invention is a grain feeder for actively feeding or livestock in an agricultural environment, and utilizing the combination of a cone structure and an agricultural tire. This type of grain feeder provides for feeding a large number of livestock at a single time, at least minimal cost to the farmer.

According to one embodiment of the present invention, there is provided a feeder including a cone member projecting from a peak to an outwardly radially circumference at an oblique angle from the peak and a circular member having an upwardly extending lip, the outward radial circumference of the cone affixed to a base of the circular member with the lip of the circular member extending upwardly whereby the base of the circular member is supported substantially planar to the ground and the peak of the cone distributes feed about the circular member up to the edge of the lip for consumption by livestock in an agricultural environment.

A significant aspect and feature of the present invention is that the feeder can be constructed from galvanized sheet metal for the cone and from an old tractor tire for the circular member. The tractor tire can be sectioned in half with a tile or butcher knife providing for a circular member with an upwardly extending lip.

Another significant aspect and feature of the present invention is a feeder which can be constructed for accommodating any size circular member depending upon the particular size of the livestock such as hogs, calves or horses, etc.

Having thus described one embodiment of the present invention, it is an object hereof to provide a grain feeder for feeding of livestock in an agricultural environment.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF PREFERRED EMBODIMENTS

Figure 1:
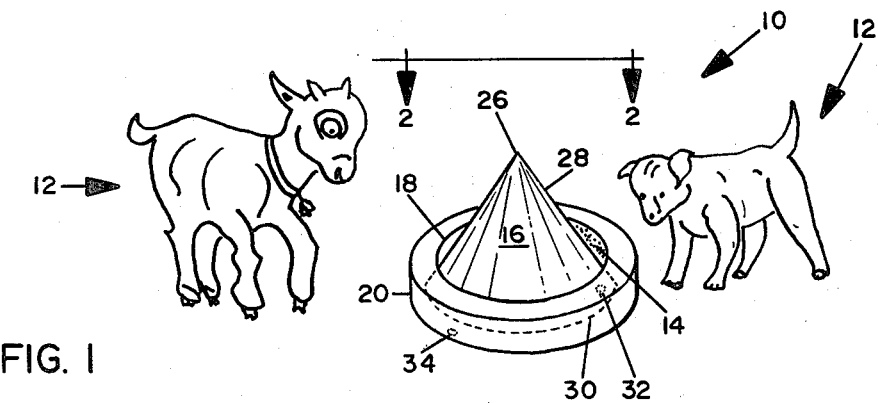
FIG. 1 illustrates a perspective view of a feeder.
Figure 3:
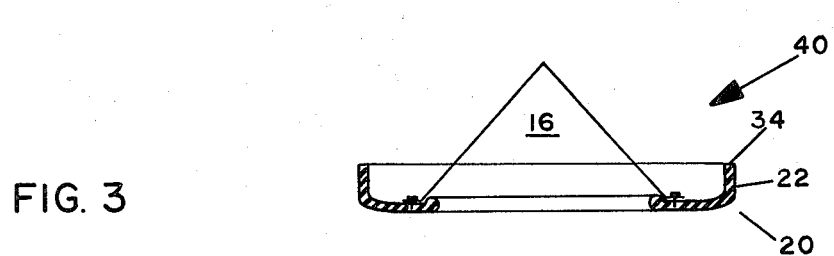
FIG. 3 illustrates an alternative embodiment of the feeder.
Figure 4:
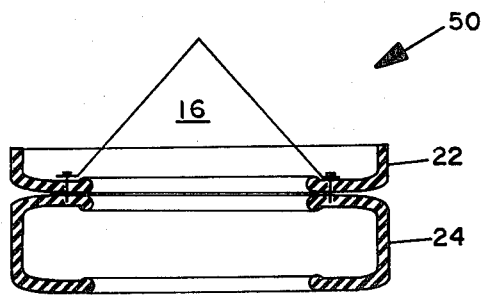
FIG. 4 illustrates another alternative embodiment.

FIG. 1, which illustrates a perspective view of the grain feeder 10, the present invention, shows an animal 12 eating feed 14 in the grain feeder 10. The grain feeder 10 includes a cone member 16 constructed from any suitable material as later described in detail secured to the lower tire bead 18 of a tire 20 such as a tractor tire. The tire 20 can be cut in half 22 as illustrated in FIG. 3 and as later described in detail. An additional lower tire or tires 24 can be utilized to support the cone member 16—tire 20 of the grain feeder 10 as illustrated in FIG. 4 and as later described in detail. The cone member 16 includes a peak 26 extending at an angle 28 to a base 30. A plurality of screws 32 such as sheet metal screws, rivets or other like fastening members secure the base 30 of the cone member 16 to the lower tire bead 18. The cone member 16 accepts, distributes and equalizes feed about the grain feeder 10. Any type of feed or mix of feeds can be utilized within the grain feeder 10. Drain holes 34 can be provided in the base of the tire 20 as illustrated in FIG. 2.

Figure 2:
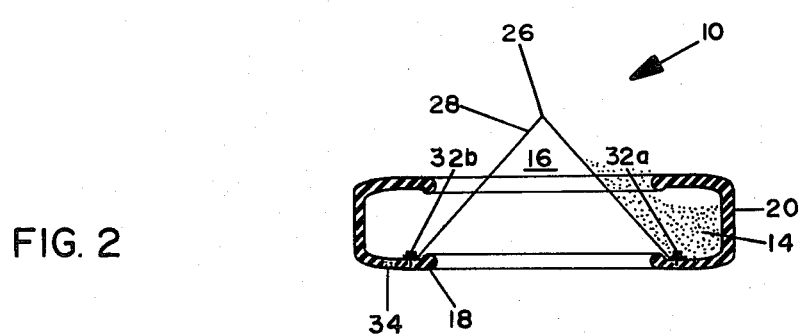
FIG. 2 illustrates a sectional view taken along line 2—2 of FIG. 1.

FIG. 2, which illustrates a sectional view of the grain feeder 10 of the present invention taken along line 2—2 of FIG. 1, shows the cone member 16, sheet metal screws 32a and 32b and tire 20. The shape of the cone member 16 is by way of example and for purposes of illustration only, as any suitable geometric configuration can be utilized in lieu of the cone member within the teachings of this patent.

FIG. 3 which illustrates an alternative embodiment 40 the present invention, shows a tire 22 which has been cut in half with a tile knife, butcher knife or other suitable instrument and is secured to a cone 16 in a likewise suitable manner as previously described for FIGS. 1 and 2. The difference between FIGS. 1 and 2 and FIG. 3 is that the upwardly extending half 34 of the tire has been deleted. The cut of the upwardly extending portion of the tire is determined based on factors of the type of grain being fed and the particular type of livestock utilizing the grain feeder.

FIG. 4, which illustrates another alternative embodiment 50 shows the grain feeder of FIG. 3 supported on an additional tire 24 thus raising the height of the grain feeder. The height of the grain feeder is determined by the particular type of livestock being fed in the agricultural environment.

MODE OF OPERATION

The grain feeder 10 of the present invention is utilized in a manner such that the grain 14 is poured over the peak 26 providing for equal distribution about the circumference between the base 30 of the cone 16 and base of the tire 20 for consumption by the livestock 12 in an agricultural environment. The tire 20 can be a tractor tire such as 18.4×34 providing for a cone of substantial dimensions to be accommodated by the base of the tire. The angle 28 of the cone is determined by the size grain, the livestock, the size of the tire, and other factors of the agricultural environment. The angle of the cone would be best in the range of 30°–60° providing for equal distribution of the feed for the livestock.

The operations of FIG. 3 of the alternative embodiment and FIG. 4 of another alternative embodiment are similar likewise in manner to that previously described for FIG. 1.

Pressed rubber, the black high-strength and lightweight material, is well suited for manufacturing the structures of FIGS. 1 and 2, and FIG. 3 as a cone piece integral structure. Utilizing pressed rubber obviates the need for fastening screws and the drain holes 34 can be easily provided in the base of the circular member. As required, the cone member 16 and the circular member in lieu of the tire can be formed as one piece integral unit member of the pressed rubber. The particular size of the cone and circular member is determined by the size of livestock and the coarseness of the grain. Inherently, larger livestock eat larger grain thereby requiring a larger feeder. The particular angles, diameters, and lip height of the circular member is again determined by the size of the livestock.

The core member 16 can be made of pressed rubber and secured to a tire such as a 18.4×34, 23.1×20, or a 14.8×38 by way of example and for purpose of illustration only with sheet metal screws or white bolts. The tire lip can be cut to any certain size dependent upon the livestock being fed and dependent upon the tire sizes. Different sizes of cone members can be utilized also with appropriate tire sizes. The cone member 16 can also be scored at apropriate horizontal heights about entire circumferences of the cone for ease in cutting the cone member 16 to different heights thereby providing that only one size cone need be sold.

Various modifications can be made to the present invention without departing from the apparent scope thereof.

Having thus described the invention, what is claimed is:

1. In combination, cone and tire feeder for feeding of grain to livestock in an agricultural environment, said feeder combination comprising:
   a. means including a cone-shaped geometrical member for equally distributing grain about a point;
   b. means for circularly holding said distributed grain for consumption by livestock, said holding means including at least two circular base tire members including an upwardly extending lip representing a substantially vertical section of a top farm tractor tire, a plurality of rain drain holes spaced about said circular base member and means securing said tires on top of each other for a bottom tire and top tire relationship where the bottom tire supports the top tire and distributing means secured thereto; and,
   c. plurality of screws securing said distributing means to said holding means whereby said screws secure said holding means to said distributing means and thereby animal feed when dumped into said feeder is distributed equally by said distributing means into said holding means for equal feed about said circular holding means for animal consumption.

2. Feeder of claim 1 wherein said tire is 18.4×34.

3. Feeder of claim 1 wherein said tire is sectioned into equal halves whereby one of said halves is secured to said distributing means.

4. Feeder of claim 1 wherein said distributing means is a cone member and said cone member consists of pressed rubber.

5. Feeder of claim 1 wherein said distributing means includes an angle in the range of 30°–60° from a point to a base about said distributing means.

* * * * *